United States Patent [19]

Pow

[11] 4,056,283
[45] Nov. 1, 1977

[54] TRUCK CONSTRUCTION

[75] Inventor: Robert Marvin Pow, Woodstock, Canada

[73] Assignee: King Seagrave Limited, Woodstock, Canada

[21] Appl. No.: 762,258

[22] Filed: Jan. 25, 1977

[51] Int. Cl.² .............................................. B60P 1/04
[52] U.S. Cl. ................................. 298/17.6; 239/657; 298/17.8
[58] Field of Search .......................... 298/1 R, 12-16, 298/17 R, 17.5-17.8, 18; 214/501; 239/657

[56] References Cited

U.S. PATENT DOCUMENTS

| 2,697,609 | 12/1954 | Chase et al. | 298/17.6 X |
| 3,620,458 | 11/1971 | Rath | 214/17.6 X |

FOREIGN PATENT DOCUMENTS

| 631,950 | 5/1963 | Belgium | 298/17.6 |
| 1,357,399 | 2/1964 | France | 298/17.6 |
| 536,608 | 10/1931 | Germany | 298/17.5 |
| 600,135 | 7/1934 | Germany | 298/17.6 |

*Primary Examiner*—Frank E. Werner
*Attorney, Agent, or Firm*—Sim & McBurney

[57] ABSTRACT

This invention provides a construction for a load-carrying vehicle which permits a dump box to dump either to the rear or to the front. The construction includes a fixed pivot for the dumping box at the rear of the frame, and a displaceable pivot for the box at the forward end of the frame. The frame contains fork means adapted selectively to engage either pivot. Locking means are provided for locking one or the other of the fork means with respect to the associated pivot. A connecting link is provided having one end pivoted at the fixed pivot and the other end pivoted to the dumping box at an intermediate location thereof. A power means such as an hydraulic cylinder is connected between a first location on the frame lying between the pivots and a second location on the box lying between the two fork means. The displaceable pivot is adapted to slide longitudinally with respect to the frame.

7 Claims, 7 Drawing Figures

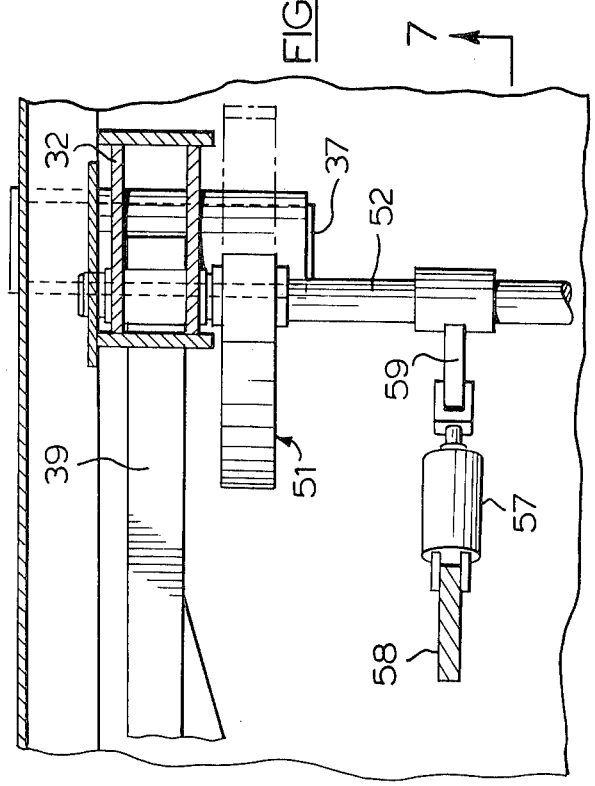
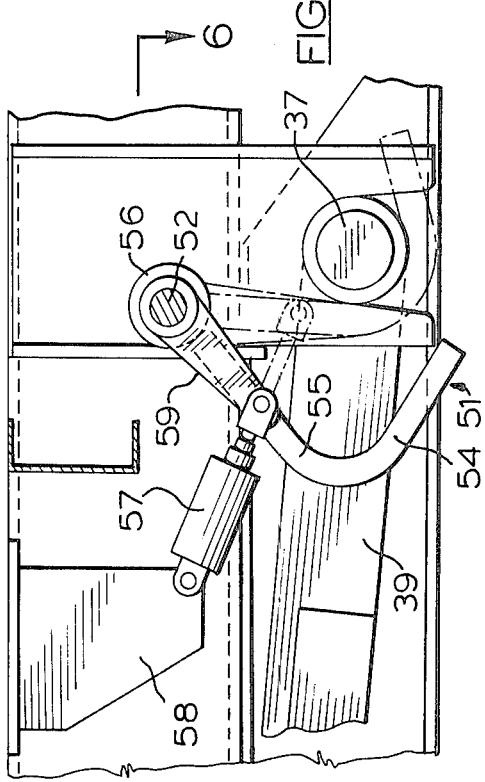
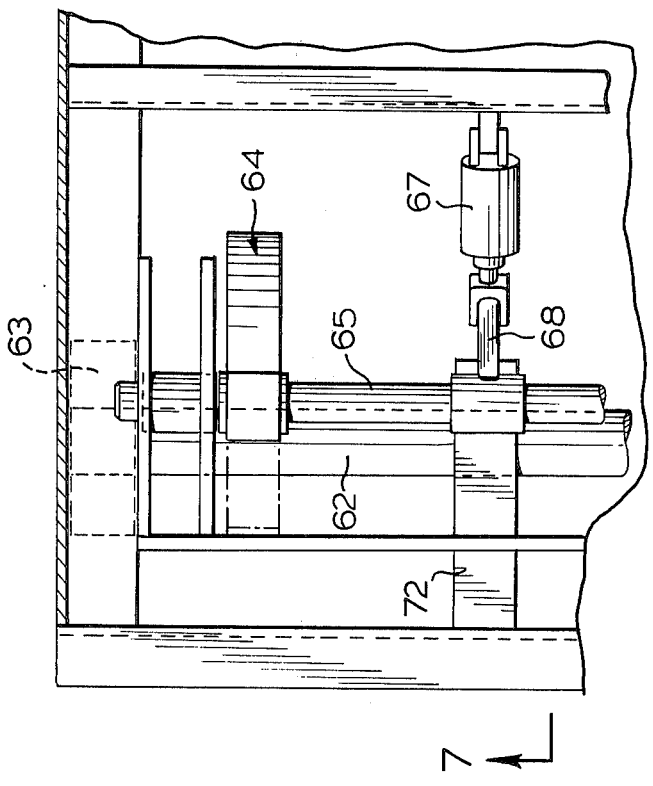
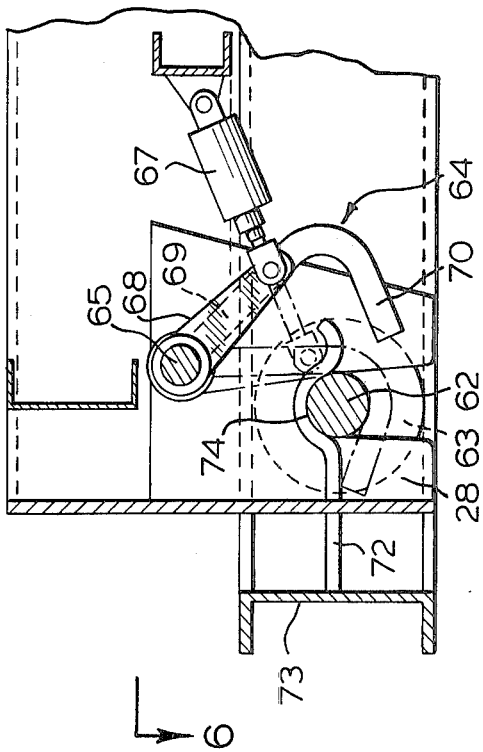

TRUCK CONSTRUCTION

This invention relates generally to a dual purpose vehicle which is adapted for use alternatively as a standard dump truck and as a spreader or scander capable of distributing sand, salt and other granulated material over a road surface.

Conventional sanders and spreaders are designed with large hoppers designed for a single purpose, which is to carry salt or sand to be spread during the winter months on roads and highways. These expensive vehicles tend to be useful only during the winter months, and for a large part of each year there is no use to which they can be put.

The prior art also includes dual purpose vehicles which are capable of use as dump trucks and also as sanders/spreaders. One such is disclosed in Canadian Pat. No. 935,206, dated Oct. 9, 1973 and entitled "Dual Purpose Vehicle" invented by Albert Rath. The dual purpose vehicle construction exemplified by the said Canadian patent includes a load-supporting frame on which a dumping box is mounted. The dumping box is capable of selective pivotal connection either at its rear or at its front end to the frame, and toggle/cylinder means are provided for urging a central point of the box upwardly with respect to the frame, in either mode of pivotal attachment. When the rear pivot is connected, energization of the cylinder raises the box in the normal dumping mode in which the contents slide to the rear. When the forward pivot is connected, raising of the dump box gives it a forward slope and the contents thereof slide toward the front.

Because of this prior art construction, and particularly in regard to the forward-dumping mode of operation, the construction illustrated in Canadian Pat. No. 935,206 is one in which the forward end wall of the dumping box is obliquely sloped upwardly to the rear when the box is horizontal, in order to allow the box to dump in the forward mode without the upper forward corner of the box striking the cab of the truck (or without having to mount the box too far back on the frame).

Other disadvantages of the general prior art dual-/dump constructions have included excessive complexity particularly in the raising mechanism, and problems associated with the alternative and selective locking of the dumping box to alternative pivot locations.

It is an aspect of this invention to provide an improved dual-purpose dump truck construction which allows forward and rearward dumping, but which permits the furthest forward position of the box in its horizontal position while not requiring the reduction of box volume which would be entailed by obliquely sloping the forward end wall.

Accordingly, this invention provides, in a load-carrying vehicle, a construction which comprises:
 a load-supporting frame having a front and a rear,
 a dumping box above the frame also having a front and a rear,
 a fixed pivot at the rear of the frame, and first engagement means on the rear of the box for engaging the fixed pivot,
 first locking means for selectively engaging or releasing said first engagement means with respect to the fixed pivot,
 connecting link means having one end pivoted at said fixed pivot and the other end pivoted to the dumping box at an intermediate location therealong,
 a displaceable pivot at the front of the frame, and second engagement means on the front of the box for engaging the displaceable pivot,
 second locking means for selectively engaging or releasing said second engagement means with respect to the displaceable pivot,
 and a power means connected between a first location on the frame which lies between said pivots, and a second location on the box which lies between said first and second engagement means, the power means being capable of extending or contracting the distance between its connection locations.

One embodiment of this invention is illustrated in the accompanying drawings, in which like numerals denote like parts throughout the several views, and in which:

FIG. 6 is a partly broken-away plan view of the locking portions of the mechanism of this invention, taken at a line 6—6 in FIG. 7; and FIG. 7 is a vertical sectional view taken at the line 7—7 in FIG. 6.

Figure 1:
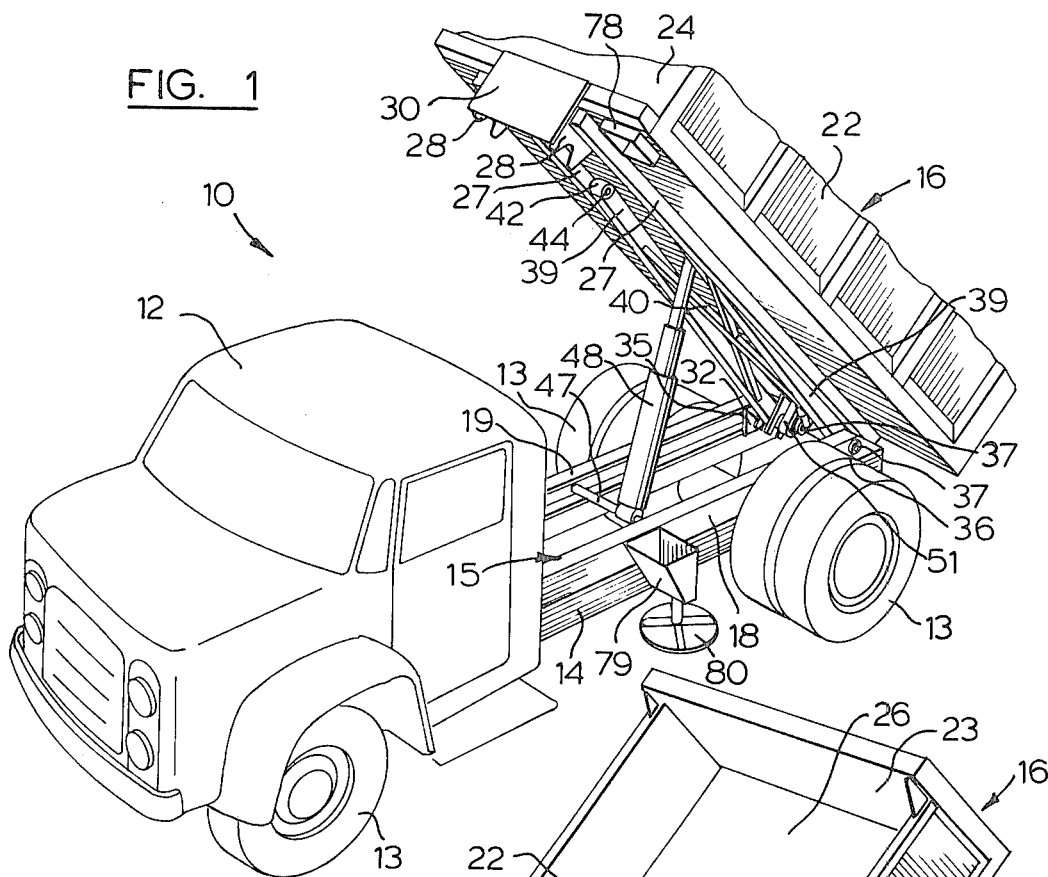
FIGS. 1 and 2 are perspective views of a dual-purpose dumping truck in the rearward and forward dumping modes, respectively.
Figure 2:
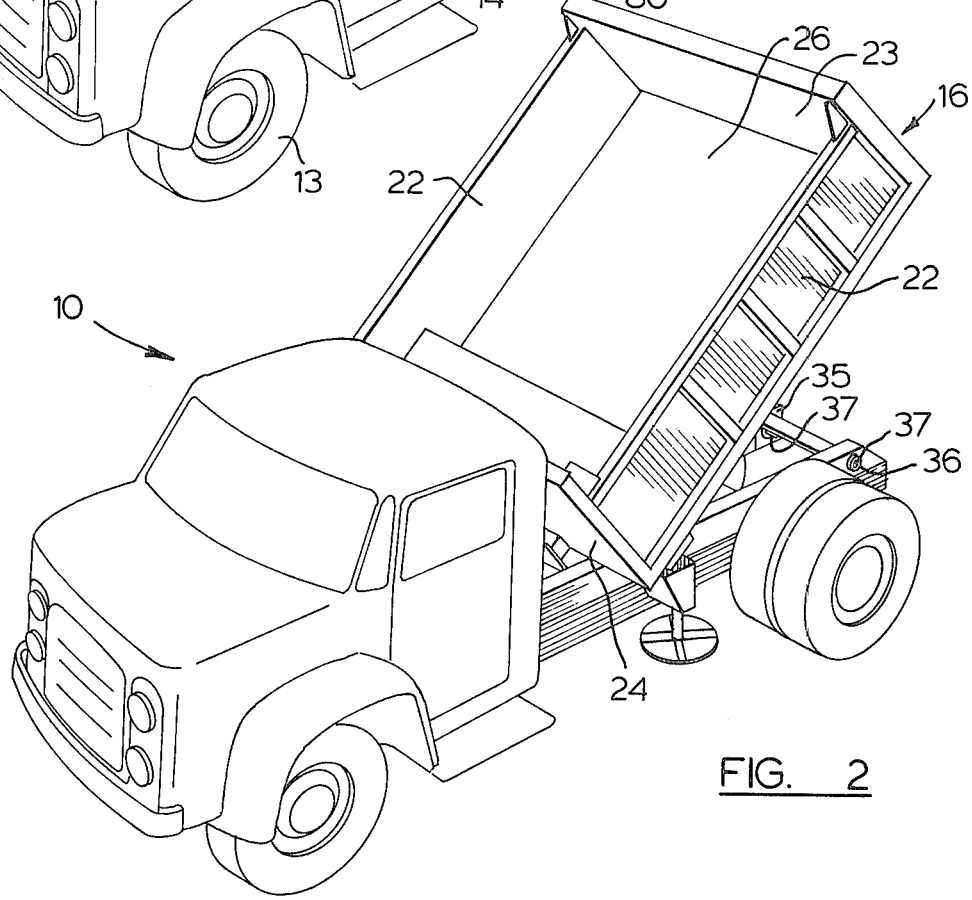

Turning first to FIGS. 1 and 2, a dump truck 10 is seen to include the usual cab 12, wheels 13, truck frame 14, a load-supporting frame 15, and a dumping box 16 above the frame 15.

The load-supporting frame 15 includes two longitudinal, parallel, spaced-apart channel members 18 and 19, with their flanges projecting inwardly.

The dumping box 16 includes side walls 22, a rear door 23, and a forward wall 24. All walls are perpendicular to the floor 26 of the dumping box 16.

As particularly well seen in FIG. 1, the underside of the box 16 includes two, longitudinal, spaced-apart support members 27 to which the floor 26 of the dump box 16 is secured. At the forward end of the support members 27 there are two downwardly extending and downwardly open forks 28 which are spaced apart by the same distance as the spacing between the support members 27. A rectangular panel 30 bridges between the forks 28 to reinforce the same, and is also secured to the remainder of the box 16.

At the rearward end of the box 16 similar structure supports two double forks 32, one pair extending downwardly from beneath the rear of each support member 27.

At the rear end of each of the longitudinal channel members 18 and 19 an additional plate 35 is welded to the flanges on the inside, and is vertically parallel but spaced from the main web of the longitudinal member. a tubular sleeve 36 passes through and is welded to both the web and the plate 35, and a pintle 37 fits into the sleeve 36 and projects inwardly for a distance of about 1 foot. In FIG. 2 the left side pintle 37 is visible in FIGS 1 and 2 the right side pintle is visible.

Figure 3:
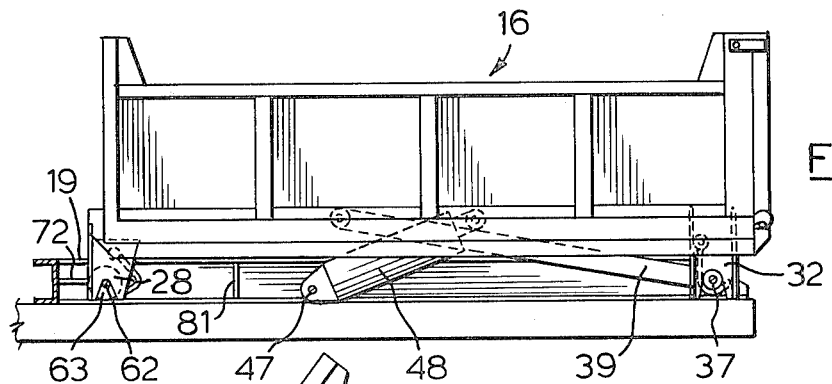
FIGS. 3, 4 and 5 are elevational views of the dumping box in its horizontal, its rearward-dumping and its forward-dumping positions, respectively.
Figure 4:
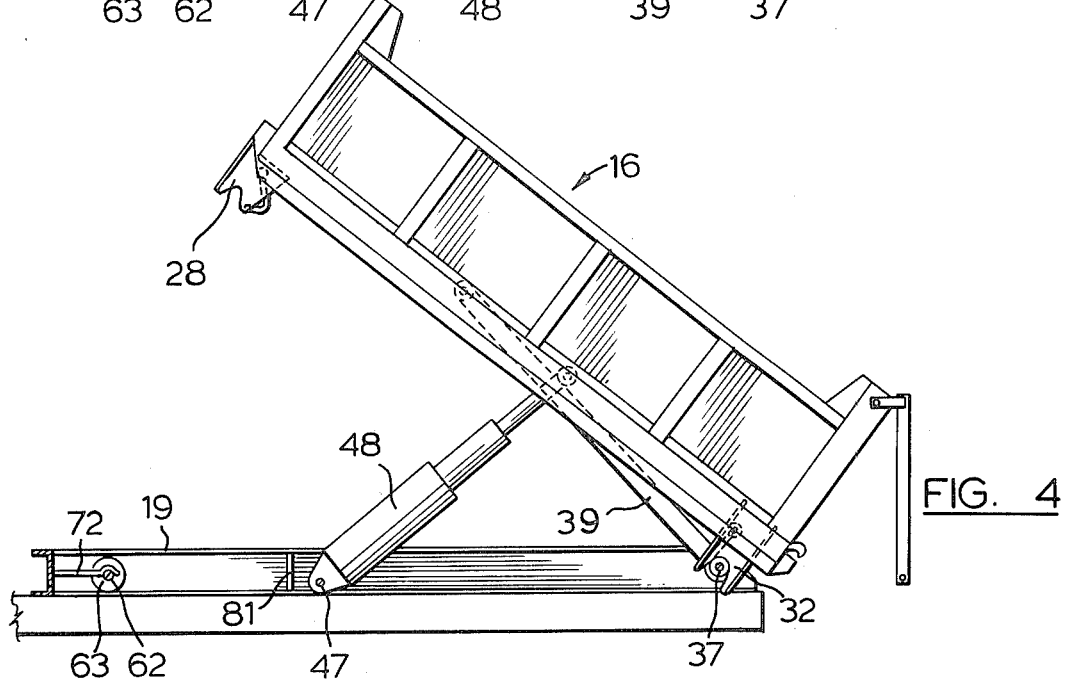

As can be seen in FIGS. 1, 3 and 4, the double pairs of forks 32 at the rear of the box 16 are adapted to engage over the pintles 37 so that the latter constitute pivot points for the dumping action involving the box 16 when it dumps its contents to the rear.

Structure is further provided to constitute a connecting link means between the frame and the box, which means does not come into play during the rearward dumping procedure. Nonetheless, the connecting link means will be described at this point because it is intimately associated with the parts just dealt with. As seen in FIG. 1, there is provided in the space between the support members 27 under the box 16 a pair of connecting arms 39 which are in longitudinal, parallel, spaced-apart relation with each other, and which are held in a rigidly fixed configuration by a cross brace 40. At the forward or upper end of each connecting member 39 is a boss 42 which engages over a pin 44 secured to and projecting inwardly from the respective support member 27. At the rearward end of each connecting member 39 a similar but larger boss is permanently engaged over the respective pintless 37. As can be seen particularly in FIG. 1, each connecting member 39 extends between the respective pair of downwardly projecting forks 32 of the box 16, when the latter is in the rearward-dumping configuration.

As seen in FIG. 1, a cross bar 47 extends transversely between the channel members 18 and 19, and to this cross bar is secured one end of a telescoping hydraulic cylinder 48, of which the other end is secured at an intermediate location on the box 16 lying between the forks 28 and 32.

To secure the box 16 in the rearward-dumping mode, a pair of locking means constituted by hook members 51 are provided, these being best seen in FIGS. 6 and 7. Each hook member 51 is pivoted at a location generally above the position of the respective pintle 37 when the box 16 is in its rearward-dumping mode, the pivot being shown in FIGS. 6 and 7 as being a transverse bar 52 which is journaled for rotation through and with respect to the downwardly projecting pairs of hook members 51. A hook 51 has a lower part 54 which is adapted to extend under the respective pintle 37 when it is in its locking condition, and has an upper arm 55 terminating in a collar 56 which is fixed with respect to the bar 52 and which rotates therewith. Thus the bar 52 itself is rotated between two positions in which the hook member 51 either engages the respective pintle or releases it. A hydraulic cylinder 57 is provided, with one end fixed to a downwardly projecting plate 58 on the underside of the box 16, and the other end pivotally connected to an arm 59 which in turn is fixed with respect to the bar 52, and which extends approximately in parallel with the upper arm 55 of the hook member 51. Thus, extension of the hydraulic cylinder 57 moves the hook member 51 from the solid-line position to the broken-line position in FIG. 7, and brings the locking feature into operation. Conversely, contraction of the hydraulic cylinder withdraws the hook member 51 from its locking configuration.

Extending between the forward ends of the channel members 18 and 19 is an axle 62, which is fixed to two rollers 63 at either end, each being adapted to rotate along and between the two flanges of a respective channel member 18 and 19. The axle 62 constitutes in effect a displaceable pivot which is capable of moving along the length of the slot 61 due to the rotation of the wheels 63. When the axle 62 is in its forward position it is in a position to be received within the downwardly projecting forks 28 at the forward end of the box 16, and this is seen in FIGS. 3, 5, 6 and 7. A hook member 64 analogous to the hook member 51 is pivoted to a bar 65 which is journaled for rotation through and with respect to the upper portion of a plate defining the downwardly projecting fork 28. In a manner similar to the construction at the rear of the box 16, there is provided a hydraulic cylinder 67 which is fixed to a portion of the box at one end and which is fixed at the other end to an arm 68 which projects from the bar 65 in a direction substantially parallel with the upper arm 69 of the hook member 64, and which is rigid with respect to the bar 65. The hook member also has a lower part 70 adapted to catch under the axle 62 when the hydraulic cylinder 67 is extended. This condition is shown in broken line in FIG. 7. Thus, extension of the hydraulic cylinder 67 locks the fork 28 around the axle 62, while contraction of the hydraulic cylinder 67 removes the restraint and allows disengagement of the fork 28 from the axle 62.

Finally, there is provided a resilient catch member 72 which extends rearwardly from a forward member 73 of the basic frame, and which is shaped to define an upward hump 74 adapted to snap around the axle 62 when the latter is its forward position, thereby to hold it in that position during the time that the box 16 may be dumping to the rear.

In operation, the driver in the cab has access to the controls for all of the cylinders 48, 57 and 67, and thus can select the dumping mode required for the box 16. If he wishes to dump the box to the rear, he presses a switch which causes the hydraulic cylinder 57 extend and to cause the hook members 51 (one on each side) to engage under the respective pintles 37, and simultaneously causes the hydraulic cylinder 67 to contract and to withdraw the hook members 64 (one on each side) from engagement with the axle 62. He then energizes the main lifting cylinder 48 to extend and to lift the box 16 into the position shown in FIG. 4. During this time, the support members 27 remain in fixed position with respect to the box 16, and rotate therewith during the dumping procedure.

Figure 5:
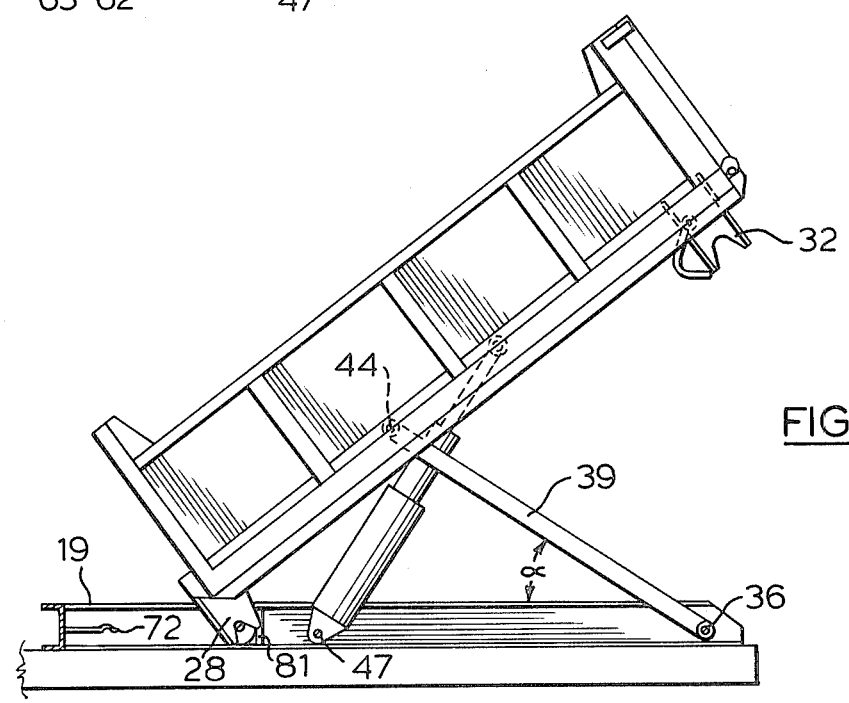

When the driver wishes to dump the box 16 in the forward direction, he reverses the cylinders 57 and 67 to withdraw the hook members 51 and to insert the insert hook members 64 beneath the axle 62. Then the main cylinder 48 is energized to move the box 16 from its FIG. 3 to its FIG. 5 position. Because the connecting members 39 are rigidly though pivotally attached to the frame and to the box, they will constitute one side of a triangle of which the other sides are constituted by the frame and the box respectively. This can be understood by referring to FIG. 5. During the forward dumping procedure, the angle $\alpha$ in FIG. 5 is made larger. Because the length of the connecting members 39 is fixed, as is the distance between the pins 44 and the opening defined by the downwardly projecting forks 28, the only way that the angle $\alpha$ can increase is to have the third side of the triangle decrease (i.e. the distance between the pintles 37 and the groove defined by the forks 28). The possibility of longitudinal movement for the axle 62 provides this capability, and it can be seen in FIG. 5 that the axle 62 have moved in the rearward direction.

As can be seen in FIG. 1, the box 16 has, on its forward end, a rectangular opening 78, while the nearer channel member 18 in FIGS. 1 and 2 has affixed to it a hopper 79 and a rotary spreader 80 of conventional construction. When the box 16 is either horizontal or in any position of the forward dumping mode, the opening 78 remains substantially aligned with the hopper 79, and granular contents within the box 16 passing downwardly through the opening 78 will automatically fall into the hopper 79 to be distributed through rotation of the spreader 80.

A conveyor chain or similar means known per se may be provided at the front end of the box for the purpose of displacing granular or particulate material from right to left in order to bring the material over the rectangular opening 78 (see FIG. 1) so that the same may be directed down onto the rotary spreader 80.

A stop-plate 81 is provided in each channel member 18 and 19 to limit the rearward extent of movement of the rollers 63.

I claim:

1. In a load-carrying vehicle, a construction which comprises:
   a load-supporting frame having a front and a rear,
   a dumping box above the frame also having a front and a rear,
   a fixed pivot at the rear of the frame, and first engagement means on the rear of the box for engaging the fixed pivot,
   first locking means for selectively engaging or releasing said first engagement means with respect to the fixed pivot,
   connecting link means having one end pivoted at said fixed pivot and the other end pivoted to the dumping box at an intermediate location therealong,
   a displaceable pivot at the front of the frame, and second engagement means on the front of the box for engaging the displaceable pivot,
   second locking means for selectively engaging or releasing said second engagement means with respect to the displaceable pivot,
   and a power means connected between a first location on the frame which lies between said pivots, and a second location on the box which lies between said first and second engagement means, the power means being capable of extending or contracting the distance between its connection locations.

2. The invention claimed in claim 1, in which the power meansis a hydraulic cylinder.

3. The invention claimed in claim 1, in which both engagement means are constituted by downwardly opening forks which register with horizontal cylindrical members constituting the respective pivots, the said locking means including engagement means including pivotally mounted hook members adapted to cooperate with the respective forks to entrap the respective cylindrical members.

4. The invention claimed in claim 3, in which the power means is a telescoping hydraulic cylinder, and in which further hydraulic means are provided for controlling the hook members.

5. The invention claimed in claim 4, in which resilient retention means are provided for retaining the displaceable pivot at the forward end of its displacement range when the corresponding second locking means are not engaged therewith.

6. The invention claimed in claim 5, in which the said hook members are pivotally mounted to the dumping box at a location generally above the position of the respective pivot when the same is engaged by the respective downwardly opening forks, the hook members being adapted to swing between a first position in which a portion of the hook member extends under the respective pivot and prevents disengagement of the pivot from the respective engagement means, and a second position in which said part of the hook member is withdrawn from its restraining position with respect to the pivot.

7. The invention claimed in claim 6, in which the dumping box is provided with an opening one one side of its forward end through which it contents may pass, and in which the load-supporting frame has a hopper and sand-thrower affixed to it in a position for receiving the contents of the dumping box passing through the said opening.

* * * * *